United States Patent
Wu et al.

(10) Patent No.: US 9,379,836 B2
(45) Date of Patent: Jun. 28, 2016

(54) RESOURCE ALLOCATION SERVER AND COMMUNICATION SYSTEM FOR CLOUD-BASED RADIO ACCESS NETWORK

(71) Applicant: National Chiao Tung University, Hsinchu (TW)

(72) Inventors: Sau-Hsuan Wu, New Taipei (TW); Hsi-Lu Chao, Taipei (TW); Chun-Hsien Ko, Taipei (TW)

(73) Assignee: National Chiao Tung University, Hsinchu (TW)

( * ) Notice: Subject to any disclaimer, the term of this patent is extended or adjusted under 35 U.S.C. 154(b) by 49 days.

(21) Appl. No.: 14/465,843

(22) Filed: Aug. 22, 2014

(65) Prior Publication Data

US 2015/0055590 A1 Feb. 26, 2015

Related U.S. Application Data

(60) Provisional application No. 61/870,061, filed on Aug. 26, 2013.

(51) Int. Cl.
*H04W 4/00* (2009.01)
*H04J 3/16* (2006.01)
(Continued)

(52) U.S. Cl.
CPC .......... *H04J 3/1694* (2013.01); *H04W 16/04* (2013.01); *H04W 24/02* (2013.01); *H04W 52/265* (2013.01); *H04W 52/346* (2013.01);
(Continued)

(58) Field of Classification Search
CPC .............................. H04W 72/04; H04W 88/08
See application file for complete search history.

(56) References Cited

U.S. PATENT DOCUMENTS

2006/0019673 A1* 1/2006 Yagyu ................... H04W 72/08
455/454
2010/0273468 A1* 10/2010 Bienas ................... H04W 24/02
455/418
(Continued)

FOREIGN PATENT DOCUMENTS

WO 2012044148 4/2012
WO 2012167496 12/2012
(Continued)

OTHER PUBLICATIONS

Huahui wang et al. (Resource allocation with load balancing for cognitive Radio Networks, Department of electrical and computer engineering, michigan state university, East Lansing, Dec. 6-10, 2010).*
(Continued)

*Primary Examiner* — Maharishi Khirodhar
(74) *Attorney, Agent, or Firm* — Jianq Chyun IP Office

(57) ABSTRACT

The server receives location data of the access points (APs) and channel request data of the APs corresponding to the location data of the APs. The server groups the channel request data of the APs into clusters according to available physical channels of the APs and the channel request data of the APs. The server allocates the available physical channels of the APs for the channel request data of the APs and transmission power configurations on each of the allocated physical channels of the APs according to the channel request data and the location data of the APs in each of the clusters. The server transmits allocated results of the allocated physical channels of the APs for the channel request data of the APs and the transmission power configurations on each of the allocated physical channels of the APs.

16 Claims, 7 Drawing Sheets

(51) Int. Cl.
| | |
|---|---|
| *H04W 52/26* | (2009.01) |
| *H04W 72/04* | (2009.01) |
| *H04W 72/08* | (2009.01) |
| *H04W 52/34* | (2009.01) |
| *H04W 24/02* | (2009.01) |
| *H04W 16/04* | (2009.01) |
| H04W 28/16 | (2009.01) |
| H04W 16/14 | (2009.01) |
| H04W 84/04 | (2009.01) |

(52) U.S. Cl.
CPC ........ *H04W72/0413* (2013.01); *H04W 72/087* (2013.01); *H04W 16/14* (2013.01); *H04W 28/16* (2013.01); *H04W 84/045* (2013.01)

(56) References Cited

U.S. PATENT DOCUMENTS

| | | | |
|---|---|---|---|
| 2014/0031049 A1* | 1/2014 | Sundaresan | H04W 16/02 455/447 |
| 2014/0045513 A1* | 2/2014 | Lim | H04W 28/18 455/452.2 |

FOREIGN PATENT DOCUMENTS

| | | |
|---|---|---|
| WO | 2013006200 | 1/2013 |
| WO | 2013048526 | 4/2013 |
| WO | 2013125918 | 8/2013 |

OTHER PUBLICATIONS

K. Chen, et al, "C-RAN: The Road Towards Green RAN, White Paper Version 2.5," China Mobile Research Institute, Oct. 2011, available at http://labs.chinamobile.com/cran/.

Karthikeyan Sundaresan, et al., "FluidNet: A Flexible Cloud-based Radio Access Network for Small Cells," ACM MobiCom, Proceedings of the 19th annual international conference on Mobile computing & networking, Sep. 2013, pp. 99-pp. 110.

Cheng Liu, et al., "The Case for Re-configurable Backhaul in Cloud-RAN based Small Cell Networks," INFOCOM, 2013 Proceedings IEEE, Apr. 2013, pp. 1124-pp. 1132.

Edited by Claudio Cicconetti, "5G radio network architecture," European Commission, Radio Access and Spectrum Cluster Projects, 2013, availible at http://www.ictras.eu/.

Sau-Hsuan Wu, et al. "Green Spectrum Sharing in a Cloud-Based Cognitive Radio Access Network," IEEE GreenCom 2013, Aug. 20-23, 2013, pp. 276-pp. 281.

Hsi-Lu Chao, et al., "Cooperative Spectrum Sharing and Scheduling in Self-Organizing Femtocell Networks," IEEE ICC, 2014, pp. 1-pp. 6.

* cited by examiner

RESOURCE ALLOCATION SERVER AND COMMUNICATION SYSTEM FOR CLOUD-BASED RADIO ACCESS NETWORK

CROSS REFERENCE TO RELATED APPLICATION

This application claims the priority benefit of U.S. provisional application Ser. No. 61/870,061, filed on Aug. 26, 2013. The entirety of the above-mentioned patent application is hereby incorporated by reference herein and made a part of specification.

BACKGROUND OF THE INVENTION

1. Field of the Invention

The present invention generally relates to a technology of resource allocation in small-cell networks, in particular, to a resource allocation server and a communication system in small-cell networks.

2. Description of Related Art

The explosive growth of mobile broadband wireless services have driven and expedited the deployment of the Third Generation Partnership Project (3GPP) LTE (Long Term Evolution) networks. The global mobile broadband subscriptions and the global mobile data traffic have been growing exponentially in the last few years. To support the exponentially growing mobile data traffic, not only is the wireless bandwidth a major concern, the power consumption is also becoming a challenging issue. Statistics show that, the total power consumption to support an operator's hundreds of millions of subscribers is over ten billion kilowatt hours, wherein about 70 percent of the power is used by the base stations (BSs).

To meet the bandwidth demands with an environmental friendly transmission technology, an emerging idea is to deploy large numbers of low-power and low cost femtocell BSs or access points (APs) in metropolitan areas, and coordinate the transmissions of the tens of thousands of BSs/APs using a cloud-based radio access network (C-RAN). Unlike typical RANs where the baseband units (BBUs) and the radio function units are situated together, the C-RAN separates the radio function units (also referred to as the remote radio heads (RRHs)) from the BBUs, wherein the RRHs are deployed with antennas at the remote site of a small-cell, and a pool of BBUs (in a data center cloud) are run by high performance and digital signal processing (DSP) processors. With such a C-RAN, not only the data rate and power efficiency of wireless transmissions can be substantially increased in a much smaller cell size, spectral usage can also be improved by applying joint radio resource management and cooperative multipoint processing (CoMP) in the cloud.

SUMMARY OF THE INVENTION

Accordingly, the present invention is directed to a resource allocation server and a communication system, which could reduce power consumption effectively and provide efficient resource usage.

The invention provides a resource allocation server. The resource allocation server comprises a radio access server, a computing load balancing (CLB) server, and a channel and power allocation (CPA) server. Location data of the access points (APs) and channel request data of the APs corresponding to the location data of the APs are received by the radio access server. The channel request data of the APs are grouped into clusters by the CLB server according to available physical channels of the APs and the channel request data of the APs. The available physical channels of the APs for the channel request data of the APs and transmission power configurations on each of the allocated physical channels of the APs are allocated by the CPA server according to the channel request data and the location data of the APs in each of the clusters. Subsequently, allocated results of the allocated physical channels of the APs for the channel request data of the APs and the transmission power configurations on each of the allocated physical channels of the APs are transmitted by the radio access server.

In an embodiment of the invention, wherein each of the channel request data of the APs comprises sector utility requests and signal to interference-plus-noise ratio (SINR) requirements corresponding to the sector utility requests. The CPA server determines whether to allocate one of the physical channels of one of the plurality of APs to each of the sector utility requests according to the location data of the APs and the SINR requirements corresponding to the sector utility requests.

In an embodiment of the invention, wherein a received SINR of each of the sector utility requests is calculated by the CPA server according to the location data of the APs and each of the SINR requirements, wherein the location data of the APs comprise sector location data of the sector utility requests. Next, one of the available physical channels of one of the APs is allocated to one of the sector utility requests by the CPA server when the received SINR of the one of the sector utility requests is met to the SINR requirement corresponding to the one of the sector utility requests.

In an embodiment of the invention, wherein a maximum transmission power on each of the allocated physical channels of the APs is determined by the CPA server. Next, the transmission power configurations on each of the allocated physical channels of the APs according to the maximum transmission power on each of the physical channels of the APs are calculated by the CPA server.

In an embodiment of the invention, wherein workloads of clusters of APs are calculated by the CLB server according to the number of the available physical channels of the APs, the number of the APs and the number of the sector utility requests of each of the APs, then, the channel request data of the APs are grouped into clusters according to the location data of the APs and the workloads of the clusters, wherein each of the workloads of the clusters is less than or equal to a maximal workload in each of the clusters.

In an embodiment of the invention, wherein the resource allocation server further comprises a spectrum resource sharing (SRS) server coupled to the radio access server. After the step of grouping the clusters, boundary APs are determined by the SRS server from the APs wherein two of the APs are determined as the boundary APs when the two of the plurality of APs are adjacent in different clusters. Next, the available physical channels of the APs are re-assigned to the boundary APs.

In an embodiment of the invention, wherein the resource allocation server further comprises a layer management server coupled to the radio access server. The APs are grouped into at least one layer by the layer management server according to the channel request data of the APs, wherein the at least one layer comprises at least one of the districts.

In an embodiment of the invention, wherein after the step of grouping the APs into the at least one service layer, the APs are determined whether to transmit a control signal according to the channel request data of the APs, so as to activate or deactivate in the at least one of the districts of the at least one layer by the layer management server according to the control signal.

This invention provides a communication system that includes APs and a server. The server is coupled to the APs. The server receives location data of the APs and channel request data of the APs corresponding to the location data of the APs. The server groups the channel request data of the APs into clusters according to available physical channels of the APs and the channel request data of the APs. The server allocates the available physical channels of the APs for the channel request data of the APs and transmission power configurations on each of the allocated physical channels of the APs according to the channel request data and the location data of the APs in each of the clusters. The server transmits allocated results of the allocated physical channels of the APs for the channel request data of the APs and the transmission power configurations on each of the allocated physical channels of the APs.

In an embodiment of the invention, wherein each of the channel request data of the APs comprises sector utility requests and SINR requirements corresponding to the sector utility requests. The server determines whether to allocate one of the available physical channels of one of the APs to each of the sector utility requests according to the location data of the APs and the SINR requirements corresponding to the sector utility requests.

In an embodiment of the invention, wherein the server calculates a received SINR of each of the sector utility requests according to the location data of the APs and each of the SINR requirements, wherein the location data of the APs comprise sector location data of the sector utility requests. The server allocates one of the allocated physical channels of one of the APs to one of the sector utility requests when the received SINR of the one of the sector utility requests is met to the SINR requirement corresponding to the one of the sector utility requests.

In an embodiment of the invention, wherein the server determines a maximum transmission power on each of the allocated physical channels of the APs, and calculates the transmission power configurations on each of the allocated physical channels of the APs according to the maximum transmission power on each of the physical channels of the APs In an embodiment of the invention, wherein the server calculates workloads of clusters of APs according to the number of the available physical channels of the APs, the number of the APs and the number of the sector utility requests of each of the Aps, the server groups the channel request data of the APs into clusters according to the location data of the APs and the workloads of the clusters, wherein each of the workloads of the clusters is less than or equal to a maximal workload in each of the clusters.

In an embodiment of the invention, wherein the server determines boundary APs from the APs, wherein at least two of the APs are determined as the boundary APs when the at least two of the APs are adjacent in different clusters. The server then re-assigns the available physical channels of the APs to the boundary APs.

In an embodiment of the invention, wherein the server groups the APs into at least one layer according to the channel request data of the APs, wherein the at least one layer comprises at least one of the districts.

In an embodiment of the invention, wherein the server further determines whether to transmit a control signal according to the channel request data of the APs, so as to activate or deactivate the APs in the at least one of the districts of the at least one layer according to the control signal.

Based on the above descriptions, the embodiments of the present invention provide a resource allocation server and a communication system. The CLB server of the resource allocation server groups the channel request data of the APs into clusters; available physical channels of the APs are allocated to the sector utility requests comprised in a channel request of one of APs according to the SINR requirements of the sector utility requests. The CPA server allocates transmission power configurations on each of the allocated physical channels of the APs according to the sector utility requests and the location data of the APs in each of the clusters. Accordingly, the resource allocation server may resolve the problem of signal interference effectively, so as to provide effective resource allocation. Beside, the resource allocation server may further reduce power consumption of large numbers of femtocell base station and the APs effectively.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

It should be understood, however, that this summary may not contain all of the aspect and embodiments of the present invention and is therefore not meant to be limiting or restrictive in any manner. Also the present invention would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
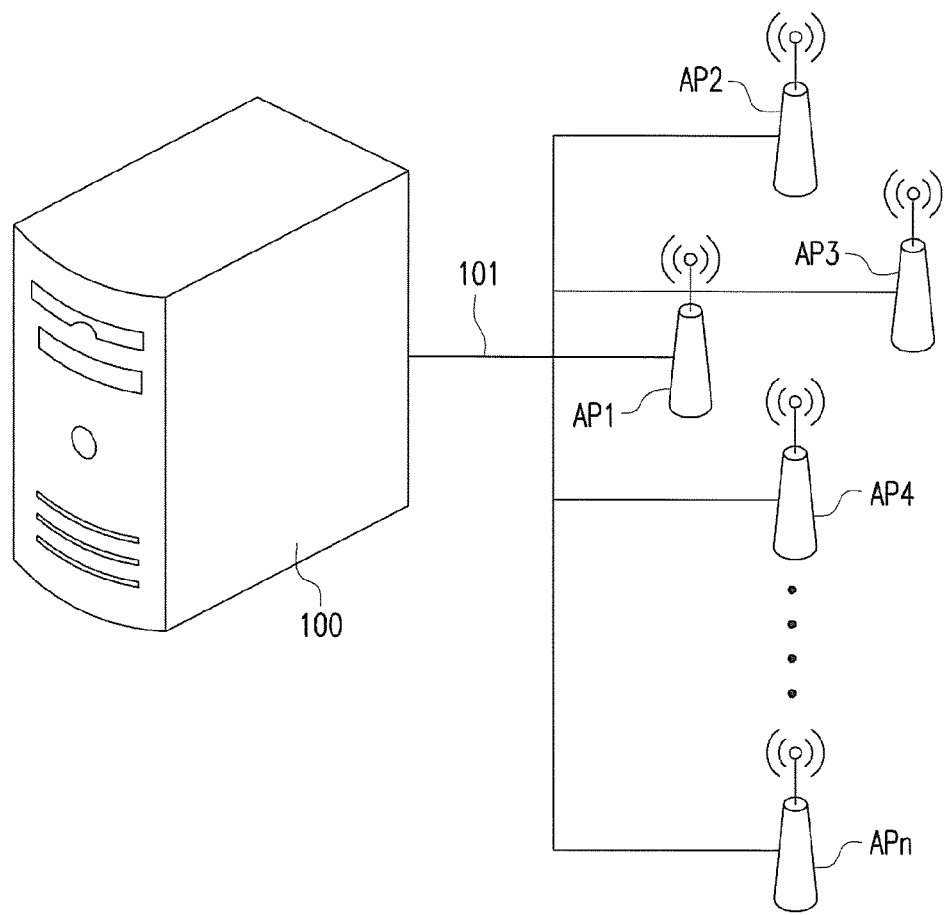
FIG. 1 is a schematic diagram illustrating a communication system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In architecture of a cloud-based radio access network (C-RAN), baseband processing with high computing requirement is moved to power-efficient cloud centers, so remote femtocell base stations (BSs) or access points (APs) controlled by the cloud centers may save more power than traditional BSs. In addition to increasing the power and spectral efficiency in wireless transmissions, standards and regulatory bodies are making ways to provide wider bandwidths for mobile services, whether in licensed (e.g. 800/900/1800/1900/2100 MHz for telecommunications) or unlicensed bands (e.g. commercial TV white space (TVWS)). Cognitive radio (CR) in TVWS has transformed from a promising technology into a practical solution and new paradigm for further broadband wireless services, wherein CR is proposed for sensing spectrum usage in wireless environment and reconfiguring system parameters (e.g. transmission power, modulation, and coding, etc.) according to the sensing result.

In exemplary embodiments of the present invention, the cognitive radio technology and the architecture of C-RAN are combined as a cloud-based cognitive RAN ($C^2$-RAN) model providing spectrum sharing and channel and power allocation, wherein a resource allocation server is configured for performing computation operation of spectrum sharing and channel and power allocation to coordinate the transmissions of large numbers (e.g. tens of thousands, millions, etc.) of BSs or APs. By grouping channel requests of APs into several clusters according to available physical channels (or spectrum) of the APs and locations of the APs, the computational complexity of each virtual machine of the channel and power allocation server may be reduced, preventing from handling large numbers of APs in each of the clusters, and interference affected by adjacent clusters may be eliminated. In addition, by allocating the available physical channels of the APs to channel requests of APs according to signal to interference-plus-noise ratio (SINR) requirements of the channel requests and transmission power requirements on the physical channels of the APs, spectrum resources may be allocated more efficiently and dynamically with granted quality of service (QoS) requirements, and power consumption of the APs may be reduced efficiently.

FIG. 1 is a schematic diagram illustrating a communication system according to an embodiment of the invention. In this embodiment, the communication system 10 comprises a resource allocation server 100 and APs AP1~APn, wherein the APs AP1~APn of the embodiment are merely exemplary examples, in the other embodiment, the amount of the APs (i.e. n) may be, for example but not limited to, ten thousand, two million, etc. . . . , and this invention is not limited thereto.

APs AP1~APn may be home node Bs (referred to as "NodeBs"), advanced nodeBs (referred to as "eNodeBs"), femto base stations, access points, for example. APs AP1~APn may contain at least but not limited to a transmitter unit, a receiver unit, an analog-to-digital (A/D) converter, a digital-to-analog (D/A) converter, a processing unit, one or more antenna units, and a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing unit is configured to process digital signal and to perform procedures related to the proposed method in accordance with exemplary embodiments of the present invention. Also, the processing unit may optionally be coupled to a memory unit to store programming codes, device configurations, a codebook, buffered or permanent data, and etc. . . . . The functions of the processing unit may be implemented using programmable units such as a micro-processor, a micro-controller, a field programmable gate array (FPGA) circuit, etc. The functions of the processing unit may also be implemented with separate electronic devices or ICs, and the processing unit may also be implemented with either hardware or software.

The resource allocation server 100 may be a file server, a database server, an application server, workstation, a personal computer, or other computing apparatuses having capability of computation, for example. The resource allocation server 100 is coupled to the APs AP1~APn respectively through wired backhaul interface 101 (e.g. digital subscriber lines (DSL), cable, or fiber), to communicate with APs AP1~APn. The resource allocation server 100 includes at least a processing unit (not shown) and at least a storage unit (not shown). The storage unit stores a plurality of subscriber registration infrmation, APs' information, channel requests, radio power map (RPM), spectrum management data, and etc. The storage unit is, for example, a memory, a hard drive, or any element used for storing the above mentioned data. The processing unit is coupled to the storage unit. The processing unit is capable of accessing data stored in the storage unit. The processing unit may be a general purpose processor, a special purpose processor, a conventional processor, a digital signal processor, a plurality of microprocessors, a microprocessor combining one or more digital signal processor cores, a controller, a microcontroller, a application specific integrated circuit (ASIC), a FPGA, a DSP chips, any other kind of integrated circuit, a state machine, a processor based on an advanced RISC machine (ARM), or the like.

Figure 2:
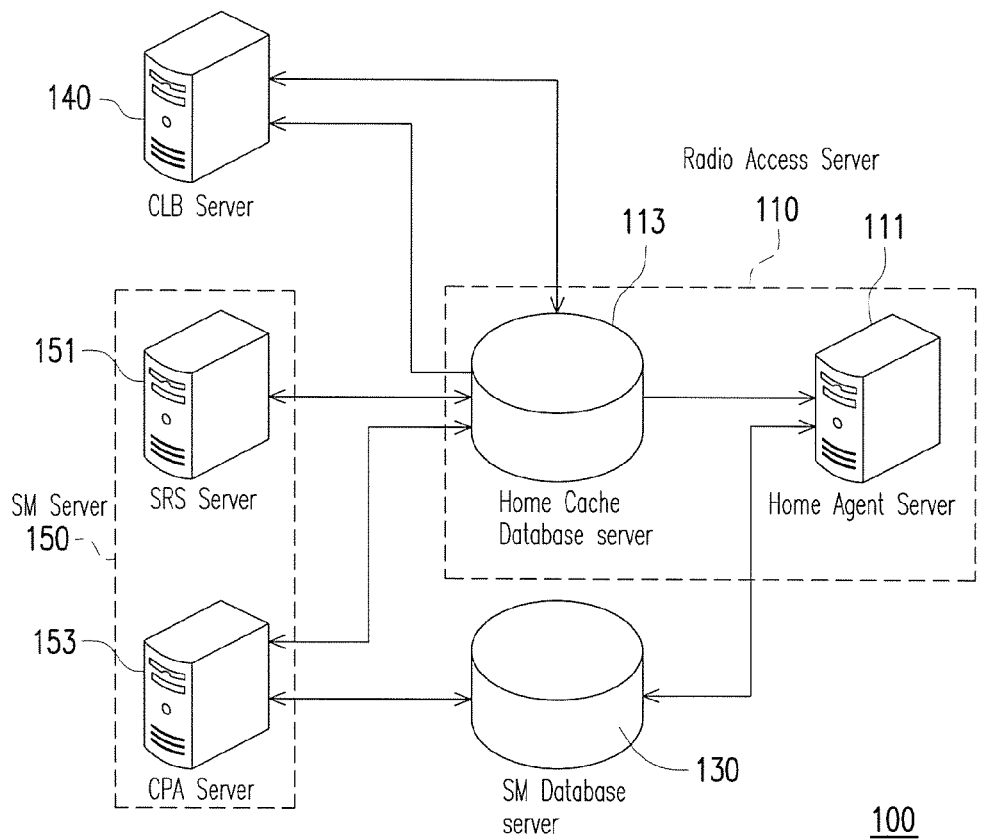
FIG. 2 is a schematic block diagram illustrating the resource allocation server according to an embodiment of the invention.

For example, FIG. 2 is a schematic block diagram illustrating the resource allocation server 100 according to an embodiment of the invention. In this embodiment, the resource allocation server 100 comprises a radio access server 110 comprising a home agent server 111 and a home cache database server 113, a spectrum management (SM) database server 130, a computing load balancing (CLB) server 140, and a SM server 150 comprising a spectrum resource sharing (SRS) server 151 and a channel and power allocation (CPA) server 153. The radio access server 110 maintains the registration information, geographical locations, associated APs (for example, APs AP1~APn in FIG. 1), and the quality-of-service (QoS) levels (for example, bandwidth requirements of applications like web browsing, video, voice over IP (VoIP), file transfer protocol (FTP), and etc. . . . ) of user equipments (UEs) (e.g. smart phone, computer, and etc. . . . ). Besides, the home agent server 111 receives channel (or spectrum) requests of APs and stores the channel requests in the SM database server 130. Based on information retrieved from the SM database server 130, the home cache database server 113, and RPM database server (not shown), the SM server 150 executed in two processing servers (i.e. SRS server 151 and the CPA server 153) distributes the available spectrum to the APs, and controls their radiation power according to the locations and QoS levels of channel requests. The CLB server 140 retrieves traffic loading information and subscriber registration information from the home cache database server 113, and groups the APs into several clusters. The detail steps of the above mentioned operation will be described in the following descriptions. Furthermore, it should be noticed that the home agent server 110, the home cache database server 113, the SM database server 130, the CLB server 140, the SRS server 151, and the CPA server 153 also include at least a processing unit (not shown) and at least a storage unit (not shown) as described in the discussion of the resource allocation server 100.

Figure 3:
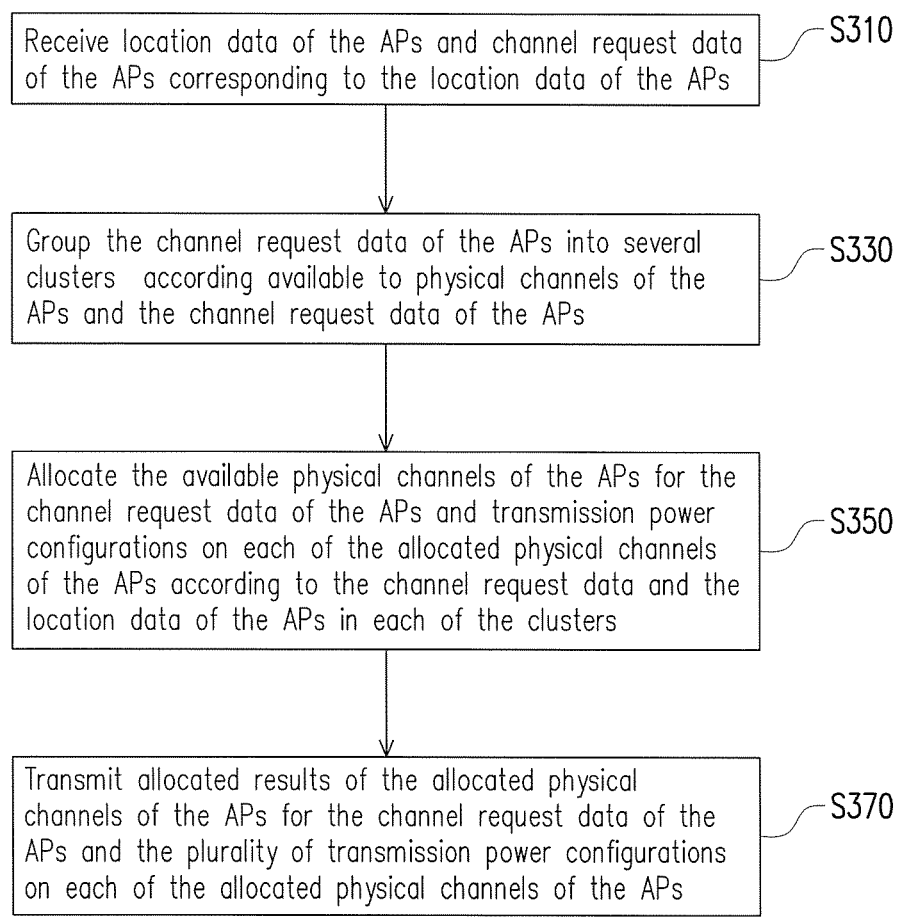
FIG. 3 is a flow chart illustrating a resource allocation method according to an embodiment of the invention.

FIG. 3 is a flow chart illustrating a resource allocation method according to an embodiment of the invention. The method disclosed in this embodiment may be executed by the processing units of the resource allocation server 100 and APs AP1~APn in FIG. 1 or FIG. 2. Steps of the method of this embodiment are described with reference to the devices shown in FIG. 1 and FIG. 2 in the following discussions.

In Step S310, the home agent server 111 receives location data of the APs AP1~APn and channel request data of the APs AP1~APn corresponding to the location data of the APs AP1~APn from the APs AP1~APn. For example, assuming the APs AP1~APn provide Internet services (e.g. web-browsing, sending e-mail, and etc. . . . ) to UEs (e.g. smart phone, computer, and etc. . . . ) respectively in each coverage area of the APs AP1~APn. After the APs AP1~APn perform association and authentication with the UEs, the UEs may send channel access requests (e.g. requests for resource blocks (RBs) in LTE, frequency bands (or bandwidth), timeslots, and etc. . . . ) for the Internet services. The APs AP1~APn may collect the channel access requests of UEs and transform the channel access requests of UEs into channel request data, wherein contents of channel request data will be described later. Then, the APs AP1~APn may transmit the channel request data and location data corresponding to the channel request data to the resource allocation server 100 via the wired backhaul. The location data may be coordinate values of global positioning system (GPS), longitude/latitude data, identifiers (IDs) of the APs AP1~APn and the UEs, and distances and angles between the APs AP1~APn and UEs, for example. Subsequently, the home agent server 111 may receive the location data of the APs AP1~APn and the channel request data of the APs AP1~APn corresponding to the location data of the APs AP1~APn, and store the location data of the APs AP1~APn and the channel request data of the APs AP1~APn in the home cache database server 113 and/or the SM database server 130.

Next, after the CLB server 140 retrieves the location data of the APs AP1~APn and the channel request data of the APs AP1~APn from the home cache database server 113, the CLB server 140 groups the channel request data of the APs AP1~APn into several clusters (e.g. the amount of the clusters is 3, 5, and etc. . . . ) according to available physical channels of the APs AP1~APn and the channel request data of the APs AP1~APn (step S330). With the growth of the mobile traffic, more APs are deployed in metropolitan areas, so that enormous amount of computational complexity may become a heavy load on the resource allocation server 100 (or cloud center), and the computation may take much execution time and thus fails to meet the real-time demand. Based on both the computation complexity and computation time constraint, the APs AP1~APn are partitioned into several clusters and multiple layers and each cluster is handled by a virtual machine (VM) of the CPA server 153, wherein the detail description of CPA algorithm of each VM of the CPA server 153 and multi-layer management method of layer management server (not shown) will be described later, and the following description will be the method of grouping of the embodiment of the invention.

In one embodiment, the CLB server 140 calculates workloads of clusters of APs according to the number of the available physical channels of the APs, the number of the APs and the number of the sector utility requests of each of the APs AP1~APn. Next, the CLB server 140 groups the channel request data of the APs into the clusters according to the location data of the APs and the workloads of the clusters, wherein each of the workloads of the clusters is less than or equal to a maximal workload in each of the clusters. In this embodiment, each of the channel request data of the APs AP1~APn comprises sector utility requests and signal to interference-plus-noise ratio (SINR) requirements corresponding to the sector utility request.

Specifically, at first, determining location relations between each of the APs AP1~APn according to the location data of the APs AP1~APn. Let diagram G=(V,E) represent a layer of the APs AP1~APn in the considered cognitive radio network (CRN) (i.e. the communication system 10), wherein V is a set of the APs AP1~APn and E is a set of links. Then, assuming all APs AP1~APn are identical, and their maximum transmission radius is D. Let be the edge and (i,j) be the distance between APi and APj which are two of the APs AP1~APn, wherein i,j∈V. If distance (i,j)<2D, then $e_{i,j}$=, otherwise $e_{i,j}$=0. Besides, assuming the coverage area of APi is $A_i$, $|A_i|$ is the area of $A_i$, and $A_{i \cap j}$ represents the coverage overlapping area of APi and APj.

Next, assuming APi and APj have $Y_i$ and $Y_j$ SU requests, the available physical channels of APi and APj are $M_i$ and $M_j$, and the number of the available physical channels of APi and APj, namely the cardinality of $M_i$ and $M_j$, are $|M_i|$ and $|M_j|$, respectively. The number of the available physical channels of APi and APj (i.e. $|M_i|$ and $|M_j|$) may be less than or equal to the number of physical channels of the layer (denoted by M).

Afterwards, suppose that the coverage area of an AP (e.g. AP1 . . . APn) may overlap with many others in the communication system 10 with densely deployed APs (e.g. AP1 . . . APn). For simplicity of system design, assuming that the associated SUs of an AP (e.g. AP1, . . . , APn) are uniformly distributed in its coverage area given that an SU can initially choose to associate with any AP from which it receives the highest radio strength. Under such an operating condition, further assuming that the average number of SUs that are associated with APi and reside in the coverage overlapping area among APi and its neighboring APs is equal to $(Y_i/|A_i|) \times |U_{i \neq j} A_{i \cap j}|$. Normalizing the number of neighboring APs with $\sum_{j \neq i} e_{i,j}$, and thus the average number of SUs that are associated with APi or another APj in their coverage overlapping area $A_{i \cap j}$ can be defined as the following equation (1):

$$Y_{i \cap j} \triangleq e_{i,j} \times \left[ \frac{Y_i}{|A_i|} \times \frac{|\bigcup_{k \neq i} A_{i \cap k}|}{\sum_{k \neq i} e_{i,j}} + \frac{Y_j}{|A_j|} \times \frac{|\bigcup_{l \neq j} A_{j \cap l}|}{\sum_{l \neq j} e_{j,l}} \right], i, j, k, l \in V \quad (1)$$

On the other hand, if also assuming that available physical channels will be uniformly allocated to SUs, then the average number of available physical channel to SUs that are associated with APi or APj in $A_{i \cap j}$ can be defined as:

$$H_{i \cap j} \triangleq \quad (2)$$

$$\frac{|H_i|}{|A_i|} \times \frac{|\bigcup_{k \neq i} A_{i \cap k}|}{\sum_{k \neq i} e_{i,j}} + \left[ e_{i,j} \frac{|H_j/H_i|}{|A_j|} + (1 - e_{i,j}) \frac{|H_j|}{|A_j|} \right] \times \frac{|\bigcup_{l \neq j} A_{j \cap l}|}{\sum_{l \neq j} e_{j,l}},$$

$$i, j, k, l \in V$$

or $H_{j \cap i}$, or the maximum of them, $\max\{H_{i \cap j}, H_{j \cap i}\}$. The notation $H_i$ stands for the physical channel set available for APi, and $|H_j/H_i|$ represents the physical channels that are in $H_j$ but not in $H_i$. Based on the above definitions for available physical channels and SUs in the coverage overlapping area $A_{i \cap j}$ of APi and APj, we further define a penalty, denoted by $p_{i,j}$, for channel shortage in $A_{i \cap j}$ as well, given by the following penalty equation (3):

$$\rho_{i,j} \triangleq \max\{0, Y_{i \cap j} - \max\{H_{i \cap j}, H_{j \cap i}\}\}, \forall i, j \in V, i \neq j \quad (3)$$

If there are more SUs than channels in a coverage overlapping area, then a penalty results. Otherwise, if there are more available physical channels than SUs, or $A_{i \cap j} = \emptyset$, then $\rho_{i,j} = 0$. It should be noted that the available physical channels for a layer is determined by the SM server 150 according to the RPM database server in the resource allocation server 100. Available physical channels of different APs may vary according to their locations and the spectrum availability in that areas. For simplicity, the available physical channels for APi is denoted by $H_i$, with $|H_i| \leq M$ and M being the number of available physical channels assigned to a layer. Although available physical channels for different APs inside a cluster are likely to be the same, the available physical channels truly set for the boundary APs of a cluster will be determined only after the cluster is formed and the SRS is done for all clusters in a layer. For clarity, the channel set $H_i$ available for APi here is, thus, denoted differently from the channel set $M_i$ assigned for APi (i.e. $M_i \subseteq H_i$).

The penalty equation (3) can be readily extended and applied to the coverage overlapping area of multiple APs, allowing us to estimate the cost of clustering before doing SRS. Specifically, boundary APs of neighboring clusters will incur a penalty if channels available in their coverage overlapping area are not enough to provide full interference avoidance among them. For the embodiment of the invention, the objective of clustering is to result in as low a penalty as possible in clustering. To this end, defining two neighboring APs as a boundary AP pair (taking APi and APj as examples) if they belong to different clusters (or VMs), and further defining a boundary edge indicator $e_{i,j}^b$ whose value is one if a boundary AP pair, (APi, APj), has $e_{i,j}^b = 1$ and zero otherwise. Following these definitions, the overall penalty for partitioning a diagram G=(V,E) into disjoint clusters can be evaluated as:

$$\rho_c \triangleq \sum_{i,j \in V} \{e_{i,j}^b \rho_{i,j}\} \quad (4)$$

Then, suppose that there are in average $d_L$ APs per kilometre squared (km²), and the number of the available physical channels for APs in a cluster are still M. The average number of links for an SU is thus equal to $L_{avg} \triangleq \pi D^2 d_L M$. Now considering an extreme case where all SUs see different links, then the number of tests for N SUs will become $\psi_{avg}(M, N) \triangleq L_{avg} + (N-1)L_{avg}^2$. Thus, the computational complexity for CPA is upper bounded by the equation (5) (i.e. the workload of a cluster):

$$\Psi_w(M, N, L) = \frac{c_p \times \psi_{avg}(M, N)}{f_{CPU}} \times \left[\frac{1}{3}L^3 + L^2 - \frac{1}{3}L\right] \quad (5)$$

wherein $f_{CPU}$ is the CPU clock frequency, and $c_p$ is a scaling constant to account for the CPU cycle overhead of programming language. The value of the equation (5) increases rapidly with the maximal numbers of APs, L, in a cluster. If we do not consider the computational loading for each cluster, then the best way to minimize the penalty is to use one cluster for all APs (e.g. AP1, ..., APn) in V.

In this embodiment, it is considered that a computer resource balancing algorithm that will minimize the sum of penalties for all clusters upon each of the clusters has a maximal workload $\psi_U$ to satisfy the real time performance constraint. Let $V_k$ be the index set of APs in cluster k. Besides, let Path(i,j) be the Boolean test to explore a feasible path between APi and APj. If there exists a path between APi and APj, Path(i,j)=1, otherwise Path(i,j)=0. Therefore, the objective and constraints of the CLB problem are formulated as the following equation (6):

$$\operatorname*{argmin}_{\{V_k\}} \sum_{i,j \in V} e_{i,j}^b \rho_{i,j} \quad (6)$$

$$\Psi_w(H(V_k), N(V_k), |V_k|) \leq \psi_U \ \& \Psi_w(H(V_k'), N(V_k')),$$

$$|V_k'| > \psi_U, \exists V_k' \subset V, \forall k$$

$$\text{s.t.} \bigcup_k V_k = V, V_k \cap V_{k'} = \emptyset, \forall (k, l), k \neq l$$

$$\text{Path}(i, l) = 1, \forall (i, j) \in V_k, \forall k$$

where we define $N(V_k) \triangleq L_{i \in V_k} N_i$, with $N_i$ being the number of SUs associated with APi, $H(V_k) \triangleq \Sigma_{i \in V_k} |H_i|$, and $V'_k \triangleq V_k \cup \{AP_j\}$, $\exists e_{i,j}^b = 1, i \in V_k, j \notin V_k$. The first constraint ensures that each cluster has included as many APs as possible to save the computation resources for CPA. Suppose that the number of clusters is large enough, this constraint also makes the workload for CPA equally distributed to the VMs, and the workload for CPA does not exceed the maximal workload $\psi_U$. The second constraint means that each of the APs AP1~APn must be served by exact one VM (or in a cluster). The third constraint indicates that the formed cluster must be connected. Afterwards, the channel request data of the APs AP1~APn may be grouped into the clusters, and the VMs in each of the clusters may operate with acceptable complexity of computation.

However, these VMs simultaneously and independently perform CPA algorithm and will not share with others how they allocate channels to the APs AP1~APn. It may occur that multiple adjacent APs, which are served by different VMs (i.e. in different clusters), share the same physical channel. This situation would result in severe co-channel interferences. Followed, it is presented the problem formulation of the spectrum resource balancing problem.

In one embodiment, the SRS server 151 determines boundary APs from the APs AP1~APn, wherein at least two of the APs AP1~APn are determined as the boundary APs when the at least two of the APs AP1~APn are adjacent in different clusters. The SRS server 151 then re-assigns the available physical channels of the APs AP1~APn to the boundary APs.

Specifically, assuming that there are B boundary APs among the clusters after performing the computer resource balancing problem. The next step is to allocate channels to the boundary APs such that they at least have different channels if they belong to different clusters and have overlapping service areas, too. Recall that the sets of available physical channels for the boundary APi, $M_i$, will be allocated, from its available channel set $H_i$. In order to allocate as many channels as needed by every AP, therefore, the embodiment of the invention would design a spectrum resource sharing (SRS) method that can additionally maximize the worst average number of channels per SU among the boundary APs. This motivates us to formulate an SRS problem as follows.

Defining an arbitrary set of channel assignments for boundary APs as $\underline{M}_B \triangleq \{M_i | i \in V_B\}$ with $V_B$ defined as the index set of all boundary APs. The objectives of the spectrum resource sharing among boundary APs is to maximize the physical channel reuse, and thus this problem can be formulated as the following equation (7):

$$\underset{\underline{M}_B}{\operatorname{argmax}} \min \left\{ \frac{|M_i|}{Y_i} \,\bigg|\, M_i \in \underline{M}_B \right\} \quad (7)$$

$$M_i \cap M_j = \emptyset, \forall\, e_{i,j}^b = 1, i \neq j, i, j \in V_B$$

s.t.

$$M_i \subset H_i, \forall\, i \in V_B$$

Two constraints of the spectrum resource sharing problem are: the allocated physical channels of any two adjacent boundary APs are mutually exclusive, and the allocated channels of a boundary AP must be a subset of its available physical channels. Furthermore, it should be noted that the step of the above mentioned CLB and SRS computation may be operated in a period of reallocating time (e.g. a hour, 3 hours, or etc. . . . ), and the allocation result may also be updated in the home cache database server 113 and SM database server 130 in the period of the reallocating time, and those having ordinary skills in the art may modify the period of reallocating time for the design requirement to implement the present invention.

Figure 4:
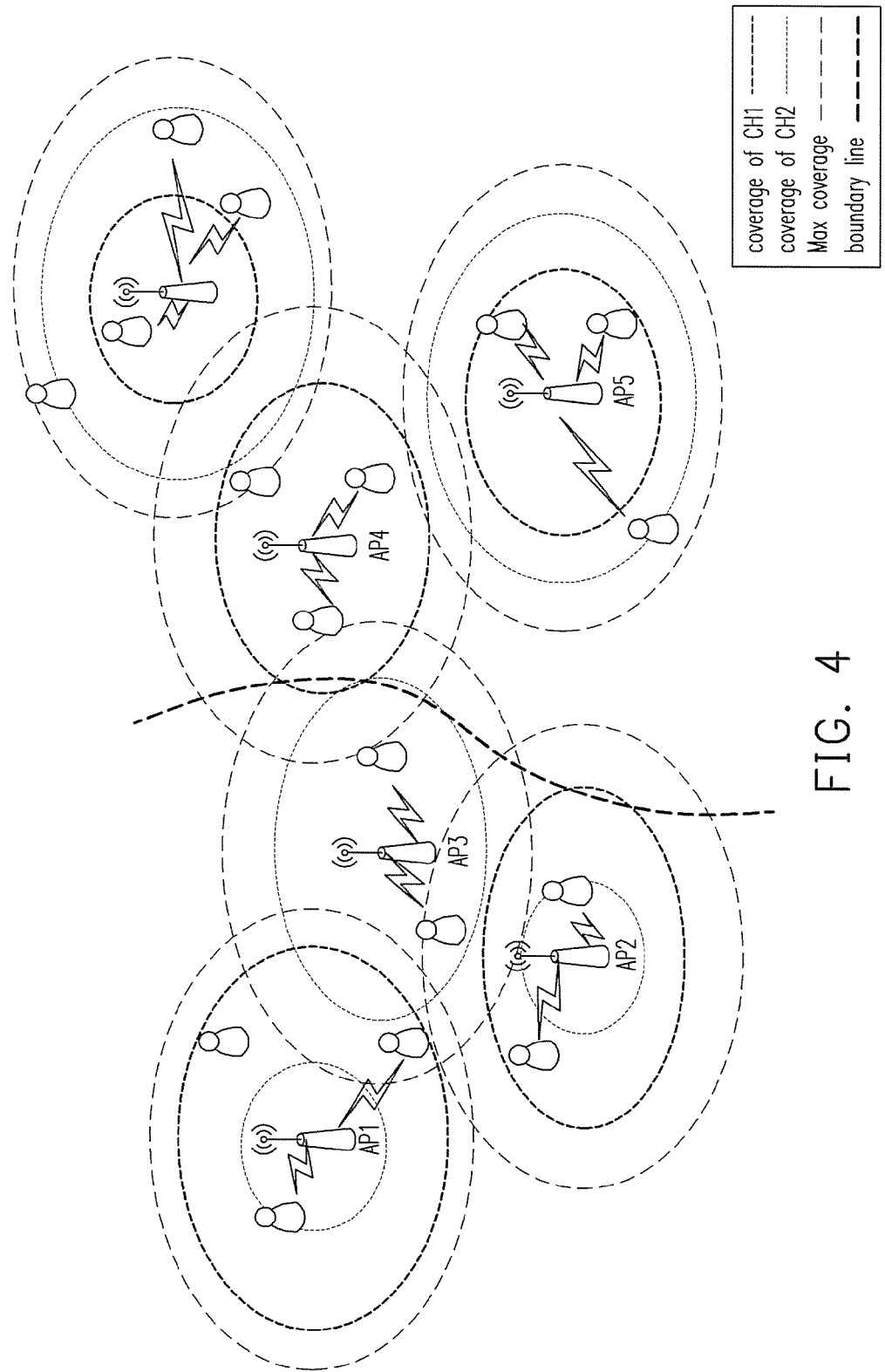
FIG. 4 is an example illustrating a spectrum resource sharing mechanism according to the embodiment of the invention.

For example, FIG. 4 is an example illustrating a spectrum resource sharing mechanism according to the embodiment of the invention. In this example, assuming the number of available physical channels is two (i.e. physical channels CH1 and CH2), and each of the APs AP1~AP6 has a coverage area with maximal transmission power. After the clusters are determined by the CLB server 140, a boundary line may separate the APs AP1~AP6 into two clusters. Considering the coverage area with maximal transmission power, AP3 and AP4 are the boundary APs in this example (AP3 and AP4 are belonged to different clusters, and the coverage areas of AP3 and AP4 are overlapped). If the available physical channels allocated to AP3 and AP4 are both physical channels CH1 and CH2, in a situation of without knowing a transmission power of each other, it may cause serious co-channel inference. Therefore, the SRS server 151 allocates different available physical channels to AP3 and AP4, wherein AP3 uses the physical channels CH2, and AP4 uses the physical channels CH1. On the other hand, non-boundary APs (i.e. AP1, AP2, AP5, and AP6) may use all available physical channels (i.e. both physical channels CH1 and CH2) under a condition that power transmission configurations of the APs AP1, AP2, AP5, and AP6 are feasible.

Figure 5:
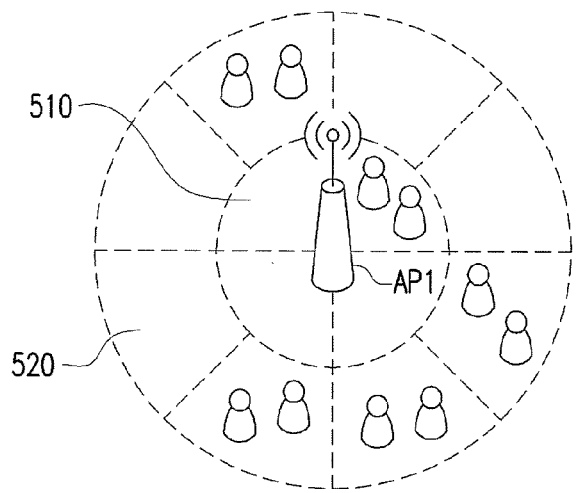
FIG. 5 is an example illustrating a coverage area of the AP1 of FIG. 1 according to an embodiment of the invention.

It should be noted that, in order to make efficient use of available physical channels, and to make the computation with acceptable complexity, the coverage area of an AP (e.g. AP1, AP2, or etc. . . . ) is partitioned into several sectors. Taking AP1 of FIG. 1 as an example, FIG. 5 is an example illustrating a coverage area of the AP1 of FIG. 1 according to an embodiment of the invention. In this embodiment, the coverage area of the AP1 is partitioned into 12 sectors as shown in FIG. 5, with four inner sectors 510 and eight outer sectors 520. Channel access requests from a sector of the AP1 are first transformed by the AP1 into a number of SU requests and corresponding to SINR requirements. Each SU request will occupy one physical channel, if granted, over the duration of a transmission time interval (TTI) in, for example but not limited to, the LTE media access control (MAC) frame format. As a result, each SU request may support a number of channel access requests issued by the same or different UEs in the same sector. Furthermore, it should be noted that the coverage area of the AP1 is merely an exemplary example, in the other embodiment, number, shape, position, and size of each grouped sector of each of the APs AP1~APn may be different, and this invention is not limited thereto.

Next, in the step S350, the CPA server 153 allocates the physical channels of the APs AP1~APn for the channel request data of the APs AP1~APn and transmission power configurations on each of the allocated physical channels of the APs AP1~APn according to the channel request data and the location data of the APs AP1~APn in each of the clusters.

In one embodiment, the CPA server 153 determines whether to allocate one of the physical channels of one of the plurality of APs AP1~APn to each of the sector utility requests according to the location data of the APs AP1~APn and the SINR requirements corresponding to the sector utility requests. Specifically, as above mentioned, the channel access requests inside a sector of one of the APs AP1~APn are lumped and transformed into a number of SU requests, say N. In addition, each sector's SU request is further associated with an SINR requirement $\bar{r}_i$, $l \in IS_N$, wherein for convenience, an index set of $\{1, \ldots N\}$ is denoted by $IS_N$ in the sequel. The location data of an SU request is thus considered as the geographical center of its serving UEs. Next, assuming there are L APs (e.g. AP1~APL, wherein 1≤L≤n) inside a cluster. Recall that the sets of available physical channels and the number of physical channels for the boundary AP1 are $\overline{M}_l$ and $|\overline{M}_l|$.

Since each SU request will be allocated to one of the APs AP1~APn only if its SINR requirement is satisfied, and may carry channel access requests from a number of UEs. Therefore, it is considered that the CPA algorithm will maximize the number of granted SU requests subject to (s.t.) a transmit power limitation on each of the physical channels. In addition, to best reuse the spectrum resources of a cluster, the SU requests in the coverage overlapped areas of two of the APs AP1~APL will be reallocated to their best one of the APs AP1~APL, considering the relative interferences among SU requests and their individual SINR requirements, even if they are issued from different ones of the APs AP1~APL. Therefore, it is defined that for each $SU_m$ request, $m \in IS_N$, and an allocation variable $X_{m,l,k}$. The value of $X_{m,l,k}$ is set to one when $SU_m$ is allocated to AP1 on the k-th physical channel, with $k \in M_l$, otherwise $X_{m,l,k}$ is set to zero.

In this embodiment, the CPA server 153 calculates a received SINR of each of the SU requests according to the location data of the APs AP1~APn and each of the SINR requirements, wherein the location data of the APs AP1~APn comprise sector location data of the SU requests, and allocates one of the physical channels of one of the APs AP1~APn to one of the SU requests when the received SINR of the one of the SU requests is met to the SINR requirement corresponding to the one of the SU requests.

Specifically, in addition to the above system requirements, it is considered a multiple access scheme in the communication system 10 of the invention where each of the physical channels of one of the APs AP1~APn can be assigned to one SU request only, namely, $\Sigma_{m=1}^{N} X_{m,l,k} \leq 1$. As a result, it is satisfied that $\Sigma_{k \in M_l} \Sigma_{m=1}^{N} X_{m,l,k} \leq |M_m|$. Besides, each SU request can be allocated to one physical channel of one of the APs AP1~APn at most, namely, $\Sigma_{k \in M_l} X_{m,l,k} \leq 1$ and $\Sigma_{k \in M_l} \Sigma_{l=1}^{L} X_{m,l,k} \leq 1$, $\forall m \in IS_N$.

On the other hand, to incorporate QoS in the communication system 10 of the invention and performance evaluations, it is considered a typical mapping between the QoS and the channel capacity C=log(1+SINR), which leads to a capacity and, hence, an average SINR constraint on each of the physical channel, given by the following equation (4):

$$r_{m,l,k} \triangleq \frac{P_{l,k} G_{m,l,k}}{N_0 + \sum_{m'=1,m' \neq m}^{N} \sum_{l'=1,l' \neq l}^{L} X_{m',l',k} P_{l',k} G_{m,l',k}} \geq \overline{r_m} \quad (4)$$

where $r_{m,l,k}$ stands for the received SINR at $SU_m$ on the k-th physical channel of AP1, and $N_0$ is the noise power. The transmit power (i.e. the transmission power configuration) of AP1 on its k-th physical channel is denoted by $P_{l,k}$, whose propagation pathloss $G_{m,l,k}$ along the path from AP1 to $SU_m$ request is defined in decibel (dB) as the following equation (5):

$$10 \log_{10}(G_{m,l,k}) = -\overline{PL}(d_0) - 10 pe \log_{10}(d_{m,l}/d_0) \quad (5)$$

where $\overline{PL}(d_0)$ is the reference free space pathloss in dB measured at a close-in reference distance $d_0$, and pe is the pathloss exponent that indicates the rate at which the pathloss increases with distances. The separation distance between $SU_m$ and AP1 is denoted by $d_{m,l}$, which may be comprised in the sector location data of the $SU_m$ request.

Afterwards, the CPA server 153 determines a maximum transmission power on each of the physical channels of the APs AP1~APL, and calculates the transmission power configurations on each of the allocated physical channels of the APs AP1~APL according to the maximum transmission power on each of the physical channels of the APs AP1~APL.

Specifically, the transmit power (i.e. the transmission power configuration) on each of the physical channels is limited to $P_k^{max}$ (i.e. the maximum transmission power), leading to a power constraint of $0 \leq P_{l,k} \leq P_k^{max}$. Then, it is formulated a downlink CPA criterion to best reutilize the channel resource as the following equation (6):

$$\arg \max_{X_{m,l,k}, P_{l,k}} \sum_{m=1}^{N} \sum_{l=1}^{L} \sum_{k \in M_j} X_{m,l,k} \quad (6)$$

$$\text{s.t.} \sum_{m=1}^{N} X_{m,l,k} \leq 1 \text{ and } \sum_{l=1}^{L} \sum_{k \in M_j} X_{m,l,k} \leq 1$$

$$0 \leq P_{l,k} \leq P_k^{max}$$

$$r_{m,j,k} \geq \overline{r_m}, \forall m \in IS_N, l \in IS_L, k \in M_l$$

From this CPA formulation, it follows immediately that a valid solution set $X_{m,l,k}$ satisfies $$\sum_{m=1}^{N} \sum_{l=1}^{L} \sum_{k \in M_j} X_{m,l,k} \leq \min\left\{N, \sum_{l=1}^{L} M_l\right\}.$$

Besides, for a set of the valid SU-AP link pairs $(m,l)_k$ in physical channel k, defined as $L_k \triangleq \{(m,l)_k | X_{m,l,k}=1, \forall m \in IS_N, l \in IS_L\}$, it follows by the equation (4):

$$P_{l,k} - \sum_{l_t \neq l, (m_t, l_t)_k \in L_k} P_{l_t,k} \frac{\overline{r_m} G_{m,l,k}}{G_{m,l,k}} \geq \frac{N_0 \overline{r_m}}{G_{m,l,k}}, \forall (m,l)_k \in L_k \quad (7)$$

Renumber the SU-AP pairs of $L_k$ as $(m_1,l_1)_k, \ldots, (m_q,l_q)_k$, wherein $q \triangleq |L_k|$, it may be defined an q×1 vector of $u_k \triangleq [N_0 \overline{r_{m_1}}/G_{m_1,m_1,k}, \ldots, N_0 \overline{r_{m_q}}/G_{m_q,m_q,k}]^T$ whose s-th entry corresponds to the $(m_s,l_s)_k$ pair of $L_k$. Accordingly, it is also defined $p_k \triangleq [P_{l_1,k}, \ldots, P_{l_q,k}]^T$, and an q×q matrix $A_k$ as $$A_k(s,t) = \begin{cases} 0, s = t \\ \overline{r_{m_s}} G_{m_s,l_t,k} / G_{m_s,l_s,k}, s \neq t \end{cases}, s, t \in IS_q \quad (8)$$

Let $I_q$ be an q×q identity matrix. The SINR constraint of equation (7) can thus be rewritten as $$(I_q - A_k) p_k \geq u_k \quad (9)$$

Given that the equality holds for the optimum solution set $L_k$, the corresponding transmit power (i.e. the transmission power configuration) of the APs AP1~APL equal to $p_k = (I_q - A_k)^{-1} u_k$. The computational complexity of solving this matrix equality with the Gaussian elimination method is $$\frac{1}{3} q^3 + q^2 - \frac{1}{3} q.$$

Since the maximum value q is equal to the number of APs in the cluster, L, the complexity is bounded from above by $$\frac{1}{3} L^3 + L^2 - \frac{1}{3} L.$$

Furthermore, it should be noted that the step of the above mentioned CPA algorithm may be computed every, for example but not limited to, 2 seconds or a second, the allocation result may also be updated in the home cache database server 113, and those having ordinary skills in the art may modify the computing time for the design requirement to implement the present invention.

Furthermore, the resource allocation server 100 further comprises a layer management server (not shown) coupled to the home agent server 111. The layer management server groups the APs AP1~APn into at least one layer according the channel request data of the APs AP1~APn, wherein the at least one layer comprises at least one of the districts. The districts may be administrative districts, clusters as above mentioned, or any other geographical districts, for example.

Figure 6:
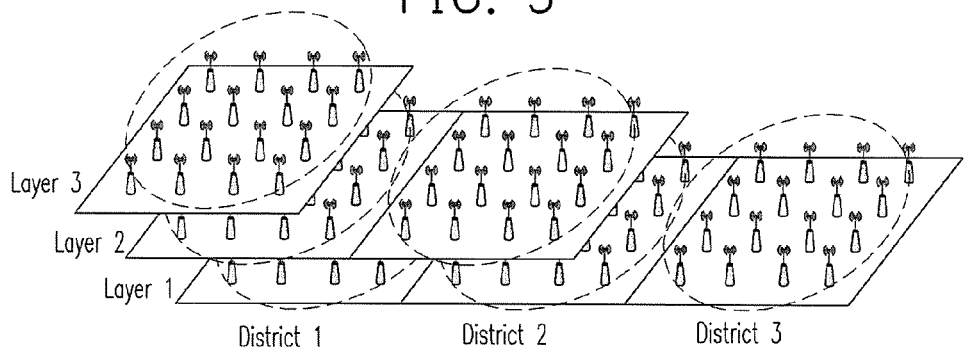
FIG. 6 is an example illustrating a multi-layer service model according to an embodiment of the invention.
Figure 6:
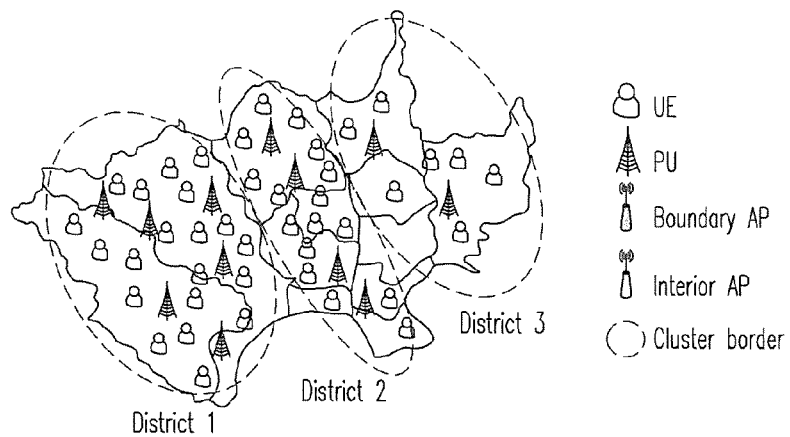

Specifically, to manage the data traffics with a common but scalable mechanism in different districts and in different times of a day, the APs AP1~APn inside a district of the communication systems 10 of the invention are further partitioned into a number of layers. For example, FIG. 6 is an example illustrating a multi-layer service model according to an embodiment of the invention. There are 3 districts, wherein district 1 is grouped into 3 layers, district 2 is grouped into 2 layers, and district 3 is grouped into 1 layer. This is because the number of APs AP1~APn deployed and activated in a certain district of the service area is determined based on the statistics of its local mobile bandwidth requirement and traffic density, which may be analyzed from the channel request data of the APs AP1~APn retrieved from the home cache database server 113. Using a multi-layer service model, the densities of the APs AP1~APn of different layers can be kept the same, and the number of available physical channels assigned to a layer can also be equal, even though the radio frequencies, or TV channels, used in different districts of a layer may not be the same. Under this network architecture, local districts with high bandwidth demands can be deployed more layers of APs as district 1 with 3 layers shown in FIG. 6. It should be noted that, the numbers of APs in a district and in a cluster encircled by a cluster border may be the same or different.

In this embodiment, the layer management server further determines whether to transmit a control signal according the channel request data of the APs AP1~APn, so as to activate or deactivate the APs AP1~APn in the at least one of the districts of a layer according to the control signal. The number of active layers in different districts can be dynamically adjusted according to the data traffic loading in different times of a day (e.g. per 6 hours, 12 hours, or a day, etc. . . . ). The layer management server may transmits a control signal (e.g. terminating power, turning on, or suspending transmission of the selected APs in one layer, etc. . . . ) for deactivating/activating the APs AP1~APn via the home agent server 111 according to the data traffic loading, which may be analyzed from the channel request data of the plurality of APs AP1~APn.

Figure 7A:
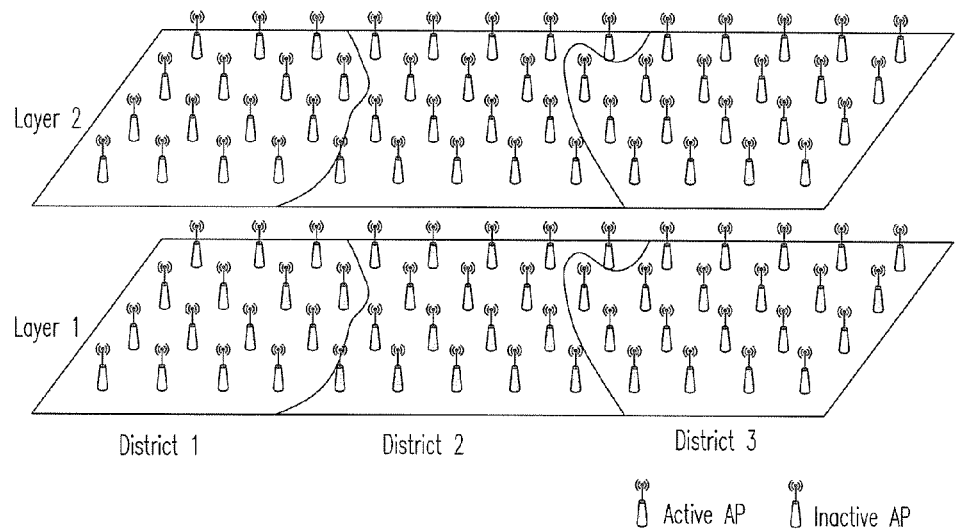
FIGS. 7A and 7B are examples illustrating a multi-layer service activating/deactivating control according to the embodiment of the invention.
Figure 7B:
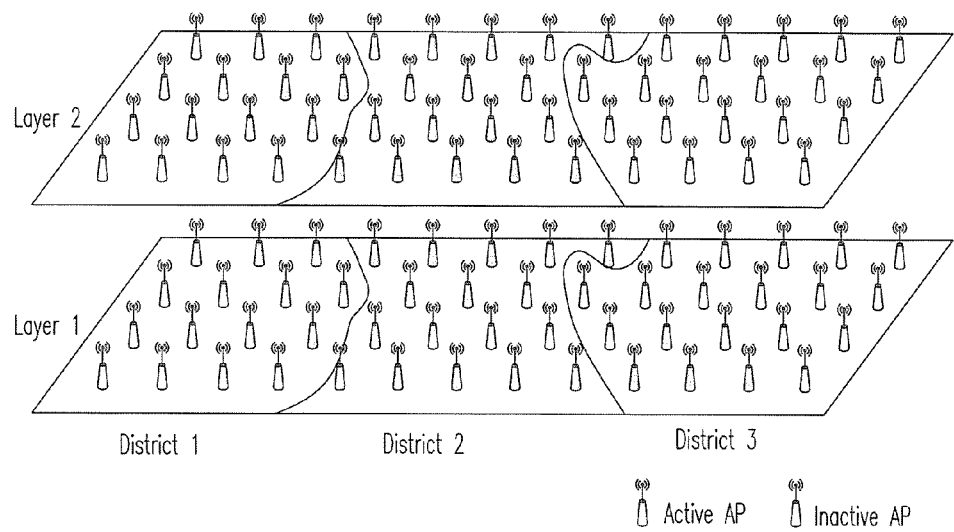

For example, FIGS. 7A and 7B are examples illustrating a multi-layer service activating/deactivating control according to the embodiment of the invention. Referring to FIG. 7A, there are three districts, and each of the districts is grouped into two layers. In the daytime (e.g. from 9:00 to 18:00), there are more people needed to be served by the Internet service in the invention. Parameters of the simulation are configured as, maximum transmission radius D=0.2357 km, density of distributed APs in a layer $d_L$=16 AP/km$^2$, the number of physical channels of the layer M=6, and the number of SU requests N=6×L, wherein there are L APs. As a result, in a condition that the number of the SU requests is less than 6, the numbers of granted SU requests of the optimal and the heuristic algorithms are almost the same, and a ratio of the allocation is nearly 80%. However, with the increase of the number of the SU requests, there is a gap between the two algorithms, and the ratio of the allocation is decreased to 60%.

In addition, table (1) is a performance comparison of the optimal and the heuristic algorithms of CLB server 140 and SRS server 151. The environment parameters of the simulation comprises nine APs arranged in square shape, four available physical channel, 1~4 randomly distributed physical channels for channel access request of each AP, maximal computational loading of VM configured at 40, and the simulation result with an average of 100 times of simulation. Nine APs are respectively grouped into 2.75 and 2.87 districts by the optimal and the heuristic algorithms of CLB server 140, and the optimal CLB algorithm has a better performance of computational loading balancing in different VMs (the standard deviation of the loading is 2.22). On the other hand, the number of the available physical channels allocated to each AP by the optimal SRS algorithm with the optimal CLB algorithm is the largest (average is 2.53 physical channels), and the number of the available physical channels allocated to each AP by the heuristic SRS algorithm with the heuristic CLB algorithm is 2 because of the complexity.

TABLE 1

|  | Number of VMs | Loding ($\mu$, $\sigma$) | Penalty (edge cost) | Number of assigned physical channels ($\mu$, $\sigma$) | | Satisfaction degree ($\mu$, $\sigma$) | |
| --- | --- | --- | --- | --- | --- | --- | --- |
|  |  |  |  | Optimal SRS | Heuristic SRS | Optimal SRS | Heuristic SRS |
| Optimal CLB | 2.75 | (32.8, 2.22) | 1.58 | (2.553, 0.45) | (2.47, 0.26) | (1.038, 0.236) | (1.010, 0.133) |
| Heuristic CLB | 2.87 | (31.4, 2.98) | 1.99 | (2.10, 0.55) | (2. 0.28) | (0.864, 0.270) | (0.818, 0.142) | the district 2, and there are fewer people in the district 2. The layer management server may deactivate the APs in the layer 2 of the district 2 in the daytime. Then, referring to FIG. 7B, the layer management server may activate the APs in the layer 2 of the district 2 and deactivate the APs in the layer 2 of the district 3 in the nighttime (e.g. from 18:00 to 9:00).

Subsequently, after the home agent server 111 retrieves the grouping result and allocated result of CPA from the home cache database server 113 and/or the SM database server 130, in the step S370, the home agent server 111 transmits allocated results of the physical channels of the APs AP1~APn for the channel request data of the APs AP1~APn, and the plurality of transmission power configurations on each of the allocated physical channels of the APs AP1~APn to the APs AP1~APn. For example, the radio access server 110 may receive the channel request data of the APs AP1~APn every two second, the CPA server 153 may make a VM responsible for a layer's CPA algorithm within two seconds, and then home agent server 111 retrieves the CPA result and transmits to the APs AP1~APn.

Figure 8:
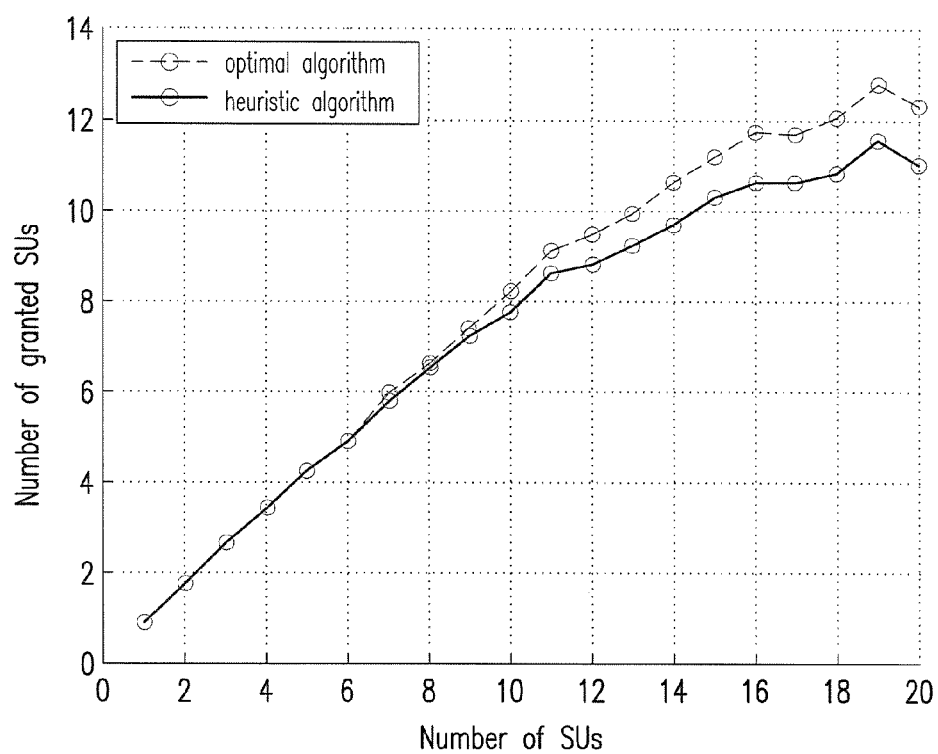
FIG. 8 is a simulation result of the CPA algorithm according to the embodiment of the invention.

For a simulation of CPA algorithm, FIG. 8 is a simulation result of the CPA algorithm according to the embodiment of To sum up, the resource allocation server and the communication system, disclosed in the embodiments of this invention, are configured to calculate workloads of the APs to group the APs into several clusters by the CLB server, to reallocate the physical channels to the boundary APs which are adjacent in different clusters by the SRS server, to allocate a physical channel of one of the APs to a SU request when the received SINR of the SU request is met to the SINR requirement of the SU request, and to allocate a suitable transmission power configuration to each of the APs without unacceptable co-channel interferences. Accordingly, the invention may reduce the computational complexity of the server and power consumption of the APs substantially, and the spectrum efficiency of the communication system of the invention has better performance. Furthermore, the communication system of the invention with multi-layer may further control the APs for each district dynamically and effectively, so as to reduce power consumption effectively and provide green energy communication.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A resource allocation server, comprising:
a radio access server, receiving location data of a plurality of access points (APs) and channel request data of the plurality of APs corresponding to the location data of the plurality of APs;
a computing load balancing (CLB) server coupled to the radio access server, the CLB server groups the channel request data of the plurality of APs into a plurality of clusters according to a plurality of available physical channels of the plurality of APs and the channel request data of the plurality of APs; and
a channel and power allocation (CPA) server coupled to the radio access server and CLB server, the CPA server allocates the plurality of available physical channels of the plurality of APs for the channel request data of the plurality of APs and a plurality of transmission power configurations on each of the plurality of allocated physical channels of the plurality of APs according to the plurality of channel request data and the location data of the plurality of APs in each of the plurality of clusters, wherein the radio access server transmits allocated results of the plurality of allocated physical channels of the plurality of APs for the channel request data of the plurality of APs and the plurality of transmission power configurations on each of the plurality of allocated physical channels of the plurality of APs.

2. The resource allocation server according to claim 1, wherein each of the channel request data of the plurality of APs comprises a plurality of sector utility requests and signal to interference-plus-noise ratio (SINR) requirements corresponding to the plurality of sector utility requests, and the CPA server determinates whether to allocate one of the plurality of available physical channels of one of the plurality of APs to each of the plurality of sector utility requests according to the location data of the plurality of APs and the SINR requirements corresponding to the plurality of sector utility requests.

3. The resource allocation server according to claim 2, wherein the CPA server calculates a received SINR of each of the plurality of sector utility requests according to the location data of the plurality of APs and each of the SINR requirements, wherein the location data of the plurality of APs comprises a plurality of sector location data of the plurality of sector utility requests, and allocates one of the plurality of available physical channels of one of the plurality of APs to one of the plurality of sector utility requests when the received SINR of the one of the plurality of sector utility requests is met to the SINR requirement corresponding to the one of the plurality of sector utility requests.

4. The resource allocation server according to claim 3, wherein the CPA server determines a maximum transmission power on each of the plurality of allocated physical channels of the plurality of APs, and calculates the plurality of transmission power configurations on each of the plurality of allocated physical channels of the plurality of APs according to the maximum transmission power on each of the plurality of physical channels of the plurality of APs.

5. The resource allocation server according to claim 3, wherein the CLB server calculates workloads of a plurality of clusters according to the number of the plurality of available physical channels of the plurality of APs, the number of the plurality of APs and the number of the plurality of sector utility requests of each of the plurality of APs, and groups the channel request data of the plurality of APs into the plurality of clusters according to the location data of the plurality of APs and the workloads of the plurality of clusters, wherein each of the workloads of the plurality of clusters is less than or equal to a maximal workload in each of the clusters.

6. The resource allocation server according to claim 5, wherein the resource allocation server further comprises:
a spectrum resource sharing (SRS) server coupled to the radio access server, determining boundary APs from the plurality of APs, wherein at least two of the plurality of APs are determined as the boundary APs when the at least two of the plurality of APs are adjacent in different clusters, and re-assigning the plurality of available physical channels of the plurality of APs to the boundary APs.

7. The resource allocation server according to claim 1, wherein the resource allocation server further comprises:
a layer management server coupled to the radio access server, grouping the plurality of APs into at least one layer according to the channel request data of the plurality of APs, wherein the at least one layer comprises at least one of a plurality of districts.

8. The resource allocation server according to claim 7, wherein the layer management server determines whether to transmit a control signal according to the channel request data of the plurality of APs, so as to activate or deactivate the plurality of APs in the at least one of the plurality of districts of the at least one layer according to the control signal.

9. A communication system, comprising:
a plurality of access points (APs); and
a server, coupled to the plurality of APs, wherein the server is configured to receiving location data of the plurality of APs and channel request data of the plurality of APs corresponding to the location data of the plurality of APs, grouping the channel request data of the plurality of APs into a plurality of clusters according to a plurality of available physical channels of the plurality of APs and the channel request data of the plurality of APs, allocating the plurality of available physical channels of the plurality of APs for the channel request data of the plurality of APs and a plurality of transmission power configurations on each of the plurality of allocated physical channels of the plurality of APs according to the plurality of channel request data and the location data of the plurality of APs in each of the plurality of clusters, and transmitting allocated results of the plurality of allocated physical channels of the plurality of APs for the channel request data of the plurality of APs and the plurality of transmission power configurations on each of the plurality of allocated physical channels of the plurality of APs.

10. The communication system according to claim 9, wherein each of the channel request data of the plurality of APs comprises a plurality of sector utility requests and signal to interference-plus-noise ratio (SINR) requirements corresponding to the plurality of sector utility requests, and the server determines whether to allocate one of the available plurality of physical channels of one of the plurality of APs to each of the plurality of sector utility requests according to the location data of the plurality of APs and the SINR requirements corresponding to the plurality of sector utility requests.

11. The communication system according to claim 10, wherein the server calculates a received SINR of each of the plurality of sector utility requests according to the location data of the plurality of APs and each of the SINR requirements, wherein the location data of the plurality of APs comprises a plurality of sector location data of the plurality of sector utility requests, and allocates one of the plurality of allocated physical channels of one of the plurality of APs to one of the plurality of sector utility requests when the received SINR of the one of the plurality of sector utility requests is met to the SINR requirement corresponding to the one of the plurality of sector utility requests.

12. The communication system according to claim 11, wherein the server determines a maximum transmission power on each of the plurality of allocated physical channels of the plurality of APs, and calculates the plurality of transmission power configurations on each of the plurality of allocated physical channels of the plurality of APs according to the maximum transmission power on each of the plurality of physical channels of the plurality of APs.

13. The communication system according to claim 11, wherein the server calculates workloads of a plurality of clusters according to the number of the plurality of available physical channels of the plurality of APs, the number of the plurality of APs and the number of the plurality of sector utility requests of each of the plurality of APs, and groups the channel request data of the plurality of APs into the plurality of clusters according to the location data of the plurality of APs and the workloads of the plurality of clusters, wherein each of the workloads of the plurality of clusters is less than or equal to a maximal workload in each of the clusters.

14. The communication system according to claim 13, wherein the server determines boundary APs from the plurality of APs, wherein at least two of the plurality of APs are determined as the boundary APs when the at least two of the plurality of APs are adjacent in different clusters, and re-assigns the plurality of available physical channels of the plurality of APs to the boundary APs.

15. The communication system according to claim 9, wherein the server groups the plurality of APs into at least one layer according to the channel request data of the plurality of APs, wherein the at least one layer comprises at least one of the plurality of districts.

16. The communication system according to claim 15, wherein the server further determines whether to transmit a control signal according to the channel request data of the plurality of APs, so as to activate or deactivate the plurality of APs in the at least one of the plurality of districts of the at least one layer according to the control signal.

* * * * *